Figure 1:
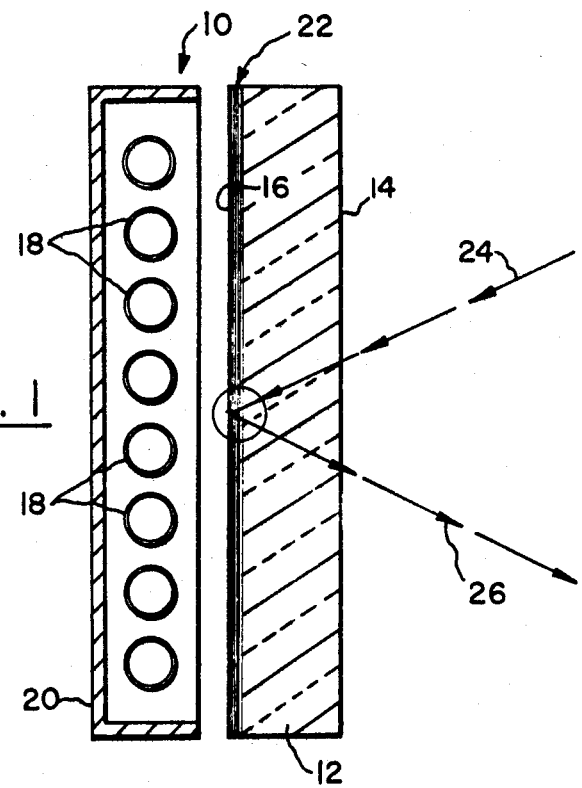

United States Patent
Eastman et al.

[11] 4,084,883
[45] Apr. 18, 1978

[54] REFLECTIVE POLARIZATION RETARDER AND LASER APPARATUS UTILIZING SAME

[75] Inventors: Jay Morgan Eastman; Stanley J. Refermat, both of Rochester, N.Y.

[73] Assignee: The University of Rochester, Rochester, N.Y.

[21] Appl. No.: 772,384

[22] Filed: Feb. 28, 1977

[51] Int. Cl.² .................... G02B 5/30; H01S 3/05
[52] U.S. Cl. .................... 350/152; 331/94.5 C; 331/94.5 T; 350/155; 350/157
[58] Field of Search .................... 350/152, 155, 157; 331/94.5 T

[56] References Cited

U.S. PATENT DOCUMENTS

| | | | |
|---|---|---|---|
| 3,534,291 | 10/1970 | Martin et al. | 331/94.5 T |
| 3,986,130 | 10/1976 | Soures et al. | 350/171 |

*Primary Examiner*—John K. Corbin
*Assistant Examiner*—R. A. Rosenberger
*Attorney, Agent, or Firm*—Martin LuKacher

[57] ABSTRACT

A reflective thin film polarization retardation device which is adapted for use in active mirror laser apparatus is described. The device permits obtaining phase retardation of light, different amounts of which may be readily obtained. Retardation results from interference effects within thin film arrays within the device. A polarization rotator utilizing the invention is made up of a thin film reflective transmissive polarizer, a thin film reflector and a phase adjusting layer, which may be one or more thin film layers. The phase adjusting layer is sandwiched between the thin film polarizer and the thin film reflector. The thin films constituting the polarizer, phase adjusting layer and reflector may be successively deposited on one of the planar faces of a body of laser glass, with the films constituting the polarizer being deposited first. The s polarization component of the incident light, which may be linearly ploarized laser light, is reflected by the polarizer and the p component of the incident light is transmitted through the polarizer and the phase adjusting layers to the reflector. The retardation interposed by the assembly is tuned by the phase adjusting layer which provides the desired amount of phase shift between the reflected s and p components. The phase shift may be (temporally) 180° such that incident, linearly polarized light in the laser glass is converted to the orthogonal polarization, thus avoiding interference effects in the laser glass.

9 Claims, 2 Drawing Figures

U.S. Patent    April 18, 1978    4,084,883

REFLECTIVE POLARIZATION RETARDER AND LASER APPARATUS UTILIZING SAME

The present invention relates to improved optical apparatus and particularly to an improved thin film reflective polarization retarder.

The invention provides improved laser apparatus when the polarization retarder is utilized with a body of laser material for rotating polarized light.

The invention is suitable for use in active mirror laser apparatus to enable laser light energy of extremely high energy density levels to be amplified and maintained in a highly directed beam.

The energy density (power density) levels which laser materials are capable of supporting is limited by the nature of such materials. Moreover, non-linearities are introduced at the high energy levels. Face pumped lasers, such as are described in U.S. Pat. No. 3,986,130 issued Oct. 12, 1976 to John M. Soures and John F. Hoose, and the patents referenced therein, and in U.S. Pat. No. 3,424,991 issued Jan. 28, 1969, are capable of supporting high energy levels. However, even such levels are limited by the non-linear effects and other spurious phenomona which occur at high energy levels. It has been found that the energy levels in the glass may be increased when the incident and emergent light waves are polarized in mutually orthogonal planes. Interference between the incident and emergent light is reduced; thus enabling the glass to support higher energy levels without non-linear diffraction effects which can result in beam steering in amounts which can not be tolerated. It is a feature of this invention to provide an improved reflective polarization rotator for use as the reflector in such active mirror amplifiers which affords not only reflection but also rotation of the plane of polarization of the laser beam in such amplifier, as well as for other purposes wherever an optical element which provides reflection and polarization rotation is needed. Such other applications may be found in various optical systems particularly those which require large apertures and wave plates for imposing retardation or phase relationships between polarization components which may be in orthogonal or other phase relationships.

The optical art has developed various forms of reflective-transmissive polarizers (see U.S. Pat. Nos. 2,982,178; 3,069,974; 3,610,729 and 3,622,225). Also, means have been provided for reflecting both components of polarized light in a manner to provide a predetermined amount of phase difference therebetween. Examples of such devices are the Fresnel Rhomb, the halfwave retardation prism, see Lostis, M. P., J. Phys. Rad., 1957, p. 51S – 52S. These devices utilize the difference in phase change upon total internal reflection for mutually orthogonal linearly polarized components of light. Another method utilizes an absorbing substrate/film combination to accomplish a desired phase retardation (Azzam et al, J. Opt. Soc. Amer.) 65, No. 3, p. 252 (1975). However, no means have been available to rotate the plane of polarization by means only of an assembly of thin interference films independent of material birefringence or the phenomenon of total internal reflection. Particularly, there have been no such means in a unitary device which is adapted for use in laser apparatus, particularly laser apparatus of the active mirror type. Retardation of light through the use of thin films has been suggested (see U.S. Pat. No. 2,409,407). However, such thin films have been used only in individual optical elements, such as prisms, for compensation purposes. It is a feature of this invention to provide an improved polarization rotator capable of reflecting both the $p$ polarization component, which is parallel to or in the plane of incidence (which is a plane including the incident beam and the normal to the planar face of the body of laser material, on which the device may be deposited, at the point of incidence), as well as the $s$ or orthogonal polarization component which is perpendicular to this plane of incidence in a spatial sense. Thus both components are produced and reflected so that polarized light can be established within the body of laser material and reflected from that body to other components such as additional laser amplifiers in the beam line of a laser system.

Accordingly, it is an object of the present invention to provide improved optical apparatus which translates incoming linearly polarized light into outgoing light, linearly polarized and orthogonal to the incident light.

It is another object of the present invention to provide improved apparatus for use in producing high power laser energy.

It is a further object of the present invention to provide an improved polarization rotator.

It is a still further object of the present invention to provide an improved polarization rotator for use in laser apparatus.

Briefly described, the invention, when used in laser apparatus having a body of laser material with faces on opposite sides thereof, is in the form of a transmissive-reflective polarization rotator which is disposed on one of these planar faces. The light is incident on the polarization rotator after passing through the body of laser material. The polarization rotator itself includes a polarizer which may contain a multiplicity of thin films which are deposited on the face of the body of laser material on which the polarization rotator is disposed. There is also provided a reflector which may also consist of a plurality of thin films. Separating the reflector and the polarizer, and sandwiched therebetween, is a layer or layers, which may also be a thin film or films, of material which interposes a predetermined phase delay upon light which is transmitted through the polarizer and reflected by the reflector. This reflected light is transmitted again through the phase adjusting layer and the polarizer. The light reflected by the polarizer and the light reflected from the reflector both are transmitted through the body of laser material. The polarizer reflects one of the polarization components, and transmits the other or orthogonal polarization component. Polarization components reflected by the polarizer may be the $s$ component, while the polarization component which is transmitted by the polarizer and is reflected by the reflector may be the $p$ component. The phase difference between the incident and emergent $p$ components may be 180°, in which case the linearly polarized light reflected by the polarization rotator and produced in the body of laser material is orthogonally polarized with respect to the incident linearly polarized light. Any predetermined phase difference between the $s$ and $p$ waves or polarization components may be obtained by controlling the thickness of the phase adjusting layer or layers. The polarization rotator may also be a separate device which is located in the beam line of a rod laser amplifier system and will serve to provide circularly polarized light for amplification in the rod amplifiers.

Figure 2:
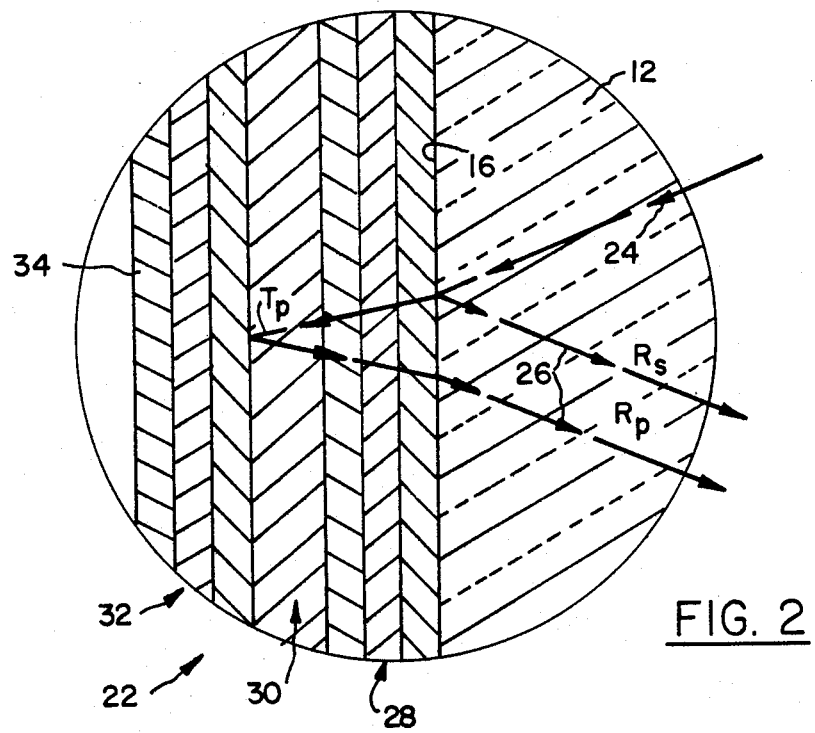

The foregoing and other objects and advantages of the invention as well as a presently preferred embodiment thereof will be more apparent from a reading of the following description in connection with the accompanying drawings in which:

FIG. 1 is a diagrammatic view of an active mirror face pump laser amplifier which uses the invention; and FIG. 2 is an enlarged diagrammatic view of a portion of the laser apparatus of FIG. 1, showing the polarization rotator, in accordance with an embodiment of the invention, in greater detail.

Referring to FIG. 1, there is shown an active mirror face pumped laser amplifier 10. The amplifier has a body of laser material 12 which may be in the form of a disc or plate. The material of the body 12 may be a neodymium doped glass. The end faces 14 and 16 of the body 12 are planar. The body itself may have transverse dimensions, if rectangular, of 15 to 20 centimeters in length by 10 to 15 centimeters in width. The thickness may be approximately 1.4 centimeters. A bank of flash lamps 18 provide pumping illumination. These lamps may be tubes disposed within a reflector 20. On the rear face 16 of the body 12 of laser material, there is disposed a polarization rotator 22.

This polarization rotator provide high reflectance for the laser light, indicated diagrammatically by the incident ray 24, which is reflected at the rear face 16 by the polarization rotator. The reflected laser light is indicated by the ray 26. The laser light is in the form of a beam which may be provided from a laser oscillator or other active mirror amplifier, disposed in array as shown in the above referenced Soures and Hoose U.S. Pat. No. 3,986,130. The pumping illumination is transmitted through the polarization rotator which has high transmission at the optical pumping radiation wavelength (e.g., from 0.35 to 0.9 micrometers as are provided by the flash lamps 18 which may be Xenon lamps). The incident or incoming light is linearly polarized. It is reflected as linearly polarized light, with a plane of polarization orthogonal to the polarization plane of the incident light, with amplification due to the pumping energy supplied by the flash lamps 18. Reflection and linear polarization orthogonal to the incident polarization plane is accomplished in the polarization rotator 22 as is shown diagrammatically, but in greater detail in FIG. 2. The plane of polarization of the incident light in this embodiment is at an angle of 45° to the plane of incidence.

The polarization rotator is, as shown in FIG. 2, provided by a thin film polarizer 28, a phase adjusting layer or layers 30 and a thin film reflector 32. The thin film polarizer consists of a multiplicity of layers (25 layers in the example given hereinafter). The reflector may also be provided by a multiplicity of layers (again 25 layers in the example given hereinafter). Only three layers are shown in FIG. 2 for purposes of simplifying the illustration. The phase adjusting layer is indicated as being a single layer although it may be provided by a plurality of layers. Each of the layers of the polarizer 28, phase adjusting means 30 and reflector 32 consists of a thin film of dielectric material. These thin films may be deposited on the face 16 of the body 12 of laser material be deposition techniques known in the art. Procedures for the design of the thin film polarizer 28 may be found by reference to Buchman, Holmes and Woodberry, 61 J. Op. Soc. of America, 1604–1616 (1971). Procedures for design of the thin film reflector 32 are found in the text entitled "Thin Film Optical Filters", by H. A. MacLeod, published by American Elsiver Publishing Co., New York, 1969, in Chapter 5 thereof, entitled "Multilayer High Reflectance Coatings".

The incident light 24 is reflected and transmitted by the polarizer 28. The polarizer 28 reflects the $s$ polarization component or wave of the incident light indicated by $R_s$. This is the component whose electric vector is in a plane perpendicular to the plane of incidence defined as the plane containing the incident and reflected rays and the normal to the surface. The polarization component orthogonal to the $s$ component is transmitted through the polarizer. This is the so-called $p$ polarization component or wave which is indicated as $T_p$. The reflector 32 is designed to reflect the $p$ wave and for that matter any light at the laser wavelength (in this example the wavelength is 1.06 micrometers) regardless of the polarization thereof. The transmitted component $T_p$ is assumed for purposes of this example, to be 100 percent transmitted and the $R_s$ component to be 100 percent reflected.

The $p$ wave is transmitted through the polarizer and phase adjusting layers, then reflected from the reflector 32 and again is transmitted through the phase adjusting layer and the polarizer into the laser glass of the body 12. The phase of the $p$ wave is retarded with respect to the $s$ wave so as to provide a predetermined phase difference between the reflected $s$ wave $R_s$ and the reflected wave $R_p$ as they exist in the laser glass body 12. Preferably this temporal phase difference is 180° which results in a rotation of the plane of polarization such that the incident and emergent linear polarizations are orthogonal. Inasmuch as the reflected waves $R_s$ and $R_p$ are also rotated by predetermined angles, preferably 0° and 180° respectively with respect to their corresponding components in the incident light 24, the light within the laser glass body 12 will be linearly polarized such that the incident and reflected waves are polarized in orthogonal directions. This orthogonal linear polarization of incident and reflected waves effectively reduces the energy of flux or flux level within the laser glass body by avoiding interference effects and thus enables the level to be increased without incurring the non-linear effects or damage to the glass as would be the case when both the incident and reflected illumination in the laser glass body were linearly polarized, with planes of polarization parallel.

The phase change or phase difference $\Phi_R$ will be seen by examination of FIG. 2 to be defined by the following equation:

$$\{[2\,\Phi_{tp}(\text{pol.}) + \phi_{R_p}(\text{refl.}) + 2\delta] - \Phi_{R_s}(\text{pol.})\} = \Phi_R$$

where, $\Phi_{tp}$(pol.) is the phase change on transmission for the $p$ wave through the polarizer 28;

$\Phi_{R_p}$(refl.) is the phase change upon reflection for the $p$ wave from the reflector 32;

$\Phi_{R_s}$(pol.) is the phase change upon reflection from the polarizer 28, and $\delta$ is the optical thickness of the phase adjusting layer, $\delta = 2\pi/\lambda\, nt$, where $n$ is the refractive index, and $t$ is the physical thickness.

The equation for $\Phi_R$ is an approximation. In the equation: total reflection of the $s$ component from the polarizer 28, $R_s = 100\%$; total transmission of the $p$ component by the polarizer 28, $T_p = 100\%$; and total reflection of the $p$ component by the reflector 32, $R_p = 100\%$, is assumed. Also the incident plane of polarization is taken as oriented 45° to the plane of incidence. The phase changes depend upon the refractive indices and thicknesses of the thin films used in the reflector, polarizer and in the phase adjusting layer. These phase changes may be computed by methods known in the art and discussed in the above referenced article and text.

By way of a specific example, the following layers of alternate high refractive index material and low refractive index material may be used to provide a reflective polarization rotator which produces a phase difference of 180° between the reflected $s$ wave $R_s$ and reflected $p$ wave $R_p$ in the laser glass material 12, (i.e., the incident and reflected resultant linearly polarized vectors (waves) are polarized in orthogonal planes). In the polarizer 12 there are 25 thin film layers which are alternately of high index of refraction and low index of refraction material. The first layer which is deposited on the face 16 is of high index of refraction material. The high index of refraction material of the polarizer has a quarter wavelength of optical thickness of 0.95 micrometers. The low index of refraction layers are a quarter wavelength optical thickness of 1.12 micrometers. The phase adjusting layer is of low index of refraction material and has a quarter wavelength optical thickness of 1.95 micrometers. The reflector has 25 thin film layers. The first of which is deposited upon the phase adjusting layer 30. In the reflector, the high index of refraction layers have a quarter wavelength optical thickness of 1.07 micrometers. The low index of refraction layers in the reflector have a quarter wavelength optical thickness of 1.27 micrometers. The substrate 30 (i.e., the medium which interfaces with the last layer of the reflector 38) is, in the foregoing example, air, which has an index of refraction of 1.0. The laser glass which interfaces with the first layer of the polarizer has an index of refraction of 1.52. The angle of incidence of the incident light 24 is 27.7°.

The dielectric material which may be used to provide the thin film layers may, in the case of the low index of refraction layers, be silicon dioxide. The high index of refraction material may be either tantalum pentoxide, zirconium dioxide or titanium dioxide. The index of refraction of the low index material may be 1.46 while the high index material of an index or refraction from 2.0 to 2.2 with 2.1 being used in the case of the exemplary design given above.

The phase change upon reflection $\Phi_{Rp}$, $\Phi_{Rs}$, the various phase change $\Phi_{tp}$ and the retardation or phase change $s$ interposed by the phase adjusting layer 30, may be altered by selection of the quarter wavelength thickness and the index of refraction of the layers, thus to provide any predetermined phase difference between the $p$ and $s$ waves. Any polarization degree, such as for elliptical polarization, as well as for circular or linear polarization, may be provided by the selection of dielectric thin film layers having the requisite indexes of refraction and thicknesses.

The polarization rotator 22, may, as illustrated in the FIGURES, be disposed on an incident medium, through which passes the light which is reflected and has its polarization components rotated by the polarization rotator 22. Alternatively the polarization rotator 22 may be disposed on any other substrate such that the incident medium is air rather than glass as shown in FIGS. 1 and 2. The interface between the substrate and the rotator 22 could be at the free surface 34 of the last layer of the reflector 32. In the event that the polarizer is utilized to provide orthogonal linear polarizations between incident and reflected light within a medium such as the laser glass, the configuration shown in FIG. 2 where the polarizer interfaces with the laser glass medium is preferred, in that this configuration provides for the requisite phase change of the polarization component in the incident light with respect to the polarization components in the reflected light for orthogonality of linear incident and reflected illumination within the laser glass medium.

The polarization rotator may be disposed on a substrate so as to have a surface at an angle of 45° to an incident linearly polarized laser beam. The emergent beam from the rotator will be at an angle of 45° to the surface (i.e., an angle of 90° between incident and emergent beams). The emergent beam will then be circularly polarized and may be applied to other laser amplifiers for amplification with the advantage of improved "B" integral of the system.

From the foregoing description it will be apparent that there has been provided an improved laser apparatus and an optical polarization rotator which in its presently preferred embodiment is used in providing improved laser apparatus. Variations and modifications of the laser apparatus as well as of the herein described polarization rotator, within the scope of the invention, will undoubtedly suggest themselves to those skilled in the art. Accordingly, the foregoing description should be taken merely as illustrative and not in any limiting sense.

What is claimed is:

1. For use in laser apparatus having a body of laser material having faces on opposite sides thereof, and through one of said faces linearly polarized laser light is received and then transmitted after being reflected at the other of said faces, a transmissive-reflective polarization rotator disposed on said other face providing rotation of the plane of polarization of the reflected light such that the incident and reflected light are polarized in orthogonal directions, said polarization rotator comprising polarizer means disposed upon said face for reflecting one of the $p$ and $s$ polarization components of said linearly polarized incident light and transmitting the other of said $p$ and $s$ polarization components thereof, a reflector means for reflecting said other of said $p$ and $s$ components of said linearly polarized light, and phase adjusting means sandwiched between said polarizing means and said reflecting means for adjusting the phase of said $p$ and $s$ components within said body such that said reflected light is polarized in a direction substantially orthogonal to the incident light.

2. The invention as set forth in claim 1 wherein polarizer means, said phase adjusting means and said reflector means each in the form of layers disposed successively in the order above stated upon said other face of said body.

3. The invention as set forth in claim 2 wherein said polarizer means is a multilayer reflective-transmissive polarizer, said reflector means is a multilayer reflector and said phase adjusting means is a single layer of predetermined thickness and of material transmissive at the wavelength of said light.

4. The invention as set forth in claim 3 wherein said layers of said polarizer are each deposited in succession as thin films upon said other face of said body.

5. The invention as set forth in claim 4 wherein said polarizer is reflective of said *s* polarization component and transmissive of said *p* polarization component, such that the electric field vectors of said received and transmitted light are all orthogonal to each other.

6. A polarization retarder for linearly polarized incident light which comprises polarizer means which reflects one polarization component of said incident light and transmits the orthogonal polarization component thereof, reflector means for receiving and reflecting from said polarizer means the said one polarization component back through said polarizer means, and phase adjusting means sandwiched between said polarizer means and said reflector means for providing a predetermined phase relationship between said one polarization component which is reflected from said polarizer means and said orthogonal polarization component which is reflected from said reflector means.

7. The invention as set forth in claim 6 including a substrate, said polarizer, reflector and phase adjusting means being provided by successive thin film layers deposited upon said substrate.

8. The invention as set forth in claim 7 wherein said substrate is a transmissive medium through which said incident light passes, and said layers constituting said polarizer means being deposited first thereon.

9. The invention as set forth in claim 7 wherein said polarizer means and said reflector means each consists of a separate multiplicity of said thin film layers, and said phase adjusting means has at least one thin film layer.

* * * * *